United States Patent
Andreotti et al.

(10) Patent No.: US 11,783,130 B2
(45) Date of Patent: Oct. 10, 2023

(54) USING UNSUPERVISED MACHINE LEARNING FOR AUTOMATIC ENTITY RESOLUTION OF NATURAL LANGUAGE RECORDS

(71) Applicant: John Snow Labs Inc., Lewes, DE (US)

(72) Inventors: Jose Pablo Andreotti, Cordoba (AR); Saif Addin Ellafi, Buenos Aires (AR); David Talby, Mercer Island, WA (US)

(73) Assignee: John Snow Labs Inc., Lewes, DE (US)

( * ) Notice: Subject to any disclaimer, the term of this patent is extended or adjusted under 35 U.S.C. 154(b) by 0 days.

(21) Appl. No.: 16/404,031

(22) Filed: May 6, 2019

(65) Prior Publication Data

US 2020/0356627 A1 Nov. 12, 2020

(51) Int. Cl.
*G06F 40/295* (2020.01)
*G06F 16/2457* (2019.01)
(Continued)

(52) U.S. Cl.
CPC ...... *G06F 40/295* (2020.01); *G06F 16/24578* (2019.01); *G06F 40/30* (2020.01); *G06N 20/00* (2019.01)

(58) Field of Classification Search
CPC ...... G06F 40/30; G06F 40/284; G06F 40/295; G06F 40/20; G06F 40/216; G06F 40/10; G06F 40/44; G06F 16/36; G06F 16/288; G06F 16/93; G06F 16/30; G06F 16/24578; G06F 16/345; G06F 16/3347; G06F 16/353; G06N 20/00; G06N 5/02; G06N 5/04; G06N 7/005; G16H 15/00;
(Continued)

(56) References Cited

U.S. PATENT DOCUMENTS 10,417,350 B1* 9/2019 Mohamed ............... G06F 40/58
10,885,082 B2* 1/2021 Stoyanovsky ........ G06F 40/169
(Continued)

OTHER PUBLICATIONS

"Compare." Merriam-Webster.com Dictionary, Merriam-Webster, https://www.merriam-webster.com/dictionary/compare. Accessed Sep. 17, 2021. (Year: 2021).*
(Continued)

*Primary Examiner* — Michelle M Koeth
(74) *Attorney, Agent, or Firm* — Richard G. Topolewski

(57) ABSTRACT

A computer process for entity resolution of natural language records including training a semantic embedding function on a corpus of unlabeled training materials. The semantic embedding function can take a word and represent it as a vector, where the vector represents the word as it relates to the semantic information of the corpus of unlabeled training materials. The process may transform a list of normalized descriptions using the semantic embedding function into a list of vector representations of the descriptions. The process may transform words from a natural language record to a vector representation of the natural language record using the semantic embedding function, and may use a named entity recognizer. The process may find a best match description from the list of normalized descriptions using the list of vector representations of the descriptions and the vector representation of the natural language record, and may include using word mover distance.

14 Claims, 11 Drawing Sheets

(51) Int. Cl.
*G06N 20/00* (2019.01)
*G06F 40/30* (2020.01)

(58) Field of Classification Search
CPC .... G16H 50/70; G16H 50/20; G06K 9/00442; G06K 9/00483; G06K 9/6215; G06K 9/6267; G06K 9/4676; G06K 9/6218; G10L 15/1815; G10L 15/1822; G10L 15/183; G10L 15/197; G10L 15/18; G16B 50/00
See application file for complete search history.

(56) References Cited

U.S. PATENT DOCUMENTS

| | | | | |
|---|---|---|---|---|
| 11,055,355 | B1* | 7/2021 | Monti | G06F 16/90332 |
| 2015/0170248 | A1* | 6/2015 | Chung | G06Q 30/0601 |
| | | | | 705/26.63 |
| 2017/0235824 | A1* | 8/2017 | Liu | G06N 20/00 |
| | | | | 707/723 |
| 2019/0278850 | A1* | 9/2019 | Atasu | G06F 40/237 |
| 2020/0265196 | A1* | 8/2020 | Ravi | G06K 9/6232 |
| 2020/0327151 | A1* | 10/2020 | Coquard | G06F 16/3347 |

OTHER PUBLICATIONS

Shi et al., "Towards Automated ICD Coding Using Deep Learning," arXiv:1711.04075v3 [cs.CL], Nov. 30, 2017. (Year: 2017).*

Suominen et al., "Evaluating the state of the art in disorder recognition and normalization of the clinical narrative",Journal of the American Medical Informatics Association, Jan. 2015; 143-154, v22(1); [https://www.ncbi.nlm.nih.gov/pmc/articles/PMC4433360] (Year: 2015).*

Leaman et al., "DNorm: disease name normalization with pairwise learning to rank",Bioinformatics. Nov. 15, 2013; 29(22): 2909-2917. [https://www.ncbi.nlm.nih.gov/pmc/articles/PMC3810844] (Year: 2013).*

Kalyan KS, S Sangeetha, "SECNLP: A Survey of Embeddings in Clinical Natural Language Processing," arXiv:1903.01039v1 [cs.CL] Mar. 4, 2019. (Year: 2019).*

Hinds, "Unsupervised Learning in Scala Using word2vec," DZone Big Data Zone website, Oct. 24, 2016, [accessible at https://dzone.com/articles/unsupervised-learning-in-scala-using-word2vec.] (Year: 2016).*

Miller, Abstract of "Information theoretic clustering of astrobiology documents," Theses for the degree of Master of Science (University of Hawaii at Manoa), Aug. 2012, Abstract only (Year: 2012).*

Luo et al., "Multi-Task Medical Concept Normalization Using Multi-View Convolutional Neural Network," Proceedings of the AAAI Conference on Artificial Intelligence, 32(1), Apr. 26, 2018. Retrieved from https://ojs.aaai.org/index.php/AAAI/article/view/12060 (Year: 2018).*

Hazoom, "Word2Vec for Phrases—Learning Embeddings for More Than One Word," Dec. 22, 2018, accessible at https://towardsdatascience.com/word2vec-for-phrases-learning-embeddings-for-more-than-one-word-727b6cf723cf (Year: 2018).*

Haoran Shi, Pengtao Xie, Zhiting Hu, Ming Zhang, Eric P. Xing, "Automated ICD Coding Using Deep Learning," [retrieved on Mar. 23, 2022] Retrieved from the internet: <URL:https://medium.com/@Petuum/automated-icd-coding-using-deep-learning-1e9170652175>.

Sameer Pradhan, Brett R. South, Noemie Elhadad, David Martinez, Lee Christensen, Amy Vogel, Hanna Suominen, Wendy W. Chapman, Guergana Savova, "Evaluating the state of the art in disorder recognition and normalization of the clinical narrative," Journal of the American Medical Informatics Association, Jan. 2015; 143-154, v22(1); [retrieved on Mar. 23, 2022] Retrieved from the internet: <URL:https://www.ncbi.nlm.nih.gov/pmc/articles/PMC4433360/>.

Robert Leaman, Rezarta Islamaj Dogan, Zhiyong Lu "DNorm: disease name normalization with pairwise learning to rank," Bioinformatics. Nov. 15, 2013; 29(22): 2909-2917; [retrieved on Mar. 23, 2022] Retrieved from the internet: <URL:https://www.ncbi.nlm.nih.gov/pmc/articles/PMC3810844/>.

\* cited by examiner

USING UNSUPERVISED MACHINE LEARNING FOR AUTOMATIC ENTITY RESOLUTION OF NATURAL LANGUAGE RECORDS

BACKGROUND OF THE INVENTION

Field of the Invention

This invention relates generally to machine learning and more specifically a machine automatically resolving entities of a natural language record into the best category given a set of categories and category descriptions and a corpus of natural language training material.

Background of the Invention

Often times there is a need to resolve records into a set of standard categories, a problem of entity resolution, also known as entity normalization. The records may start with natural language notes and from that the proper category needs to be determined. To date, the ability to resolve records to their proper category has been out of the hands of a computer program. Various systems have attempted to allow the automatic resolution of natural language notes into their proper categories. For example in the medical field an interaction with a doctor may generate a patient record in regards to the visit. The patient record needs to be resolved and associated—based on the notes—with the correct medical condition(s). The medical field employs skilled individuals to properly associate notes from patient records with the proper medical condition.

Similarly in the legal field there are natural language records in court records. And although a court record might mention an individual or company such as Michael or Delta, being able to resolve those noun phrases to a concrete entity such as a particular Michael (Michael Douglas, Michael Keaton, or Michael Jackson) or the correct Delta (Delta Dental, Delta Airlines or Delta Faucets) is technically challenging for a computer system. Or when a witness statement contains the phrase "altering the content of records" does that mean, given the natural language record and prior cases does that mean (a) "Fraudulent falsification of records" or (b) "replacing names in the forms," where (a) and (b) are particular legal statutes, that may be used to file a lawsuit under.

Various attempts have been made to automate the process of converting natural language notes into standard categories but none have achieved the level of effectiveness necessary to have confidence in the assigned category produced by the systems. Hand coded systems have been tried but to limited success for example DNorm uses "pairwise learning to rank" information retrieval technique. The DNorm Company manually annotates National Center for Biotechnology Information, NCBI, disease corpus text with disease mentions, as well as their corresponding concept identifiers in MEDIC (MErged DIsease voCabulary). DNorm relies on one-to-many relationships created by the manual annotation between search terms and target concepts. For updates over time manual annotations are again required, making the overall process time consuming and expensive.

MetaMap is another system that has used information in the form of rules and Information Retrieval on this problem. The system parses the natural language sentence and does 'variant generation' (a kind of query expansion), then the system retrieves potential candidates from the UMLS Metathesaurus system of the U.S. National Library of Medicine where UMLS stands for Unified Medical Language System. The system expects an exact string match between variant generated sentences and the candidates from UMLS Metathesaurus. The query expansion step is weak. The system relies on hand engineered ontologies that a knowledgeable person needs to update manually. For example whenever a new drug, disease or symptom, or new relationships among them is established in the literature then each of those relationships needs to be manually entered into the ontology. The pure string matching fails to allow richer/fuzzier relationships to be captured and used for proper categorization.

YTEX offers a system that is a knowledge based system that relies on UMLS with Word Sense Disambiguation (WSD) techniques. YTEX relies on some data structures in UMLS so YTEX is limited to the information defined in UMLS.

The current systems often are dependent on human labeled data which is tedious and time-consuming. Being able to automatically without human intervention learn relationships between the words for a large amount of data and then transforming those relationships into a method that properly resolves natural language records into their proper category has been elusive.

Electronic Health Records are ubiquitous and growing as of 2015, about 9 in 10 (87%) of office-based physicians had adopted an electronic health records (EHR) system, also by March 2017, 67% of all providers reported using an EHR. The task of normalizing diseases, diagnoses, and treatments is important in many administrative tasks such as billing, and is typically performed by humans. The professionals in charge of performing this task need special training.

A particular vexing problem that an entity resolver system faces is when words from the natural language record fail to exist in any category description, but a knowledge expert would know clearly the proper description even though none of the words match. Humans produce natural language records for other humans to read, the natural language is not intended to enable automatic entity resolution by a computer.

Looking specifically at electronic health records (EHR) there has been an explosion of medical data written in electronic health records but the information entered in natural language portion of it is not fully available for diagnostic and long-term trend analysis. Sometimes reviewing the notes overtime in detail may reveal conditions missed unless there is a holistic understanding of the information collected about a patient, including the notes.

Even mundane tasks such as billing become a problem as highly trained professionals need to be in charge of reading the notes to assign the proper billing code. Errors in this process can lead to painful, expensive and time consuming litigation.

What is needed is a system that can minimize or omit the manual process and increase the productivity, reduce the errors and have a positive impact on the tedious but important job of entity resolution.

SUMMARY OF THE INVENTION

The present disclosure describes a computer process for entity resolution of natural language records that may include training a semantic embedding function on a corpus of unlabeled of training materials. The semantic embedding function can take a word and represent it as a vector, where the vector represents the word as it relates to the semantic information of the corpus of unlabeled training materials.

The process may transform a list of descriptions using the semantic embedding function into a list of vector representations of the descriptions. The process may transform words from a natural language record to a vector representation of the natural language record using the semantic embedding function, and may use a named entity recognizer. The process may find a best match description from the list of descriptions using the list of vector representations of the descriptions and the vector representation of the natural language record, and may include using word mover distance.

The process where finding the best match description is a two-step process with a screening step that screens the list of descriptions using the vector representation of the descriptions to get a list of candidate descriptions and a ranking step that further processes the list of candidate descriptions to find the best match description. The process where the screening step uses a k-d tree search. The process where the screening step uses locality-sensitive hashing. The process where finding the best match uses word mover distance. The process where finding the best match is a probabilistic best match. The process further including using a named entity recognizer on the natural language record. The process further including using chunking or colocation detection on the natural language record. The process further including using parsing/noun phrase detection.

DETAILED DESCRIPTION

In the descriptions found in this document numerous specific details are set forth in order to provide a more thorough understanding of particular embodiments. It will be apparent, however, to an artisan of ordinary skill that what this document presents may be practiced without incorporating all aspects of the specific details described. Furthermore, although steps or processes are set forth in order to provide understanding, the order is just an example and is not limiting. One of ordinary skill in the art would recognize that one or more steps or processes may be performed simultaneously or in multiple process flows without departing from the spirit or the scope of what is described. In other instances, specific features well known to those of ordinary skill in the art (for example training an embedding function, Named Entity Recognizers, k-d tree search, Locality Sensitivity Hashing search, etc.) have not been described in detail to avoid distraction. It should be noted that although examples are set forth herein, the claim language—and the full scope of any equivalents—is what defines the scope of what is claimed.

The term "Natural Language" refers to a human language such as English, Russian, German, Japanese etc. and are composed of words typically strung together to make up sentences.

The term "Computer" refers to an electronic device capable implementing the process or results described in this document.

Figure 1:
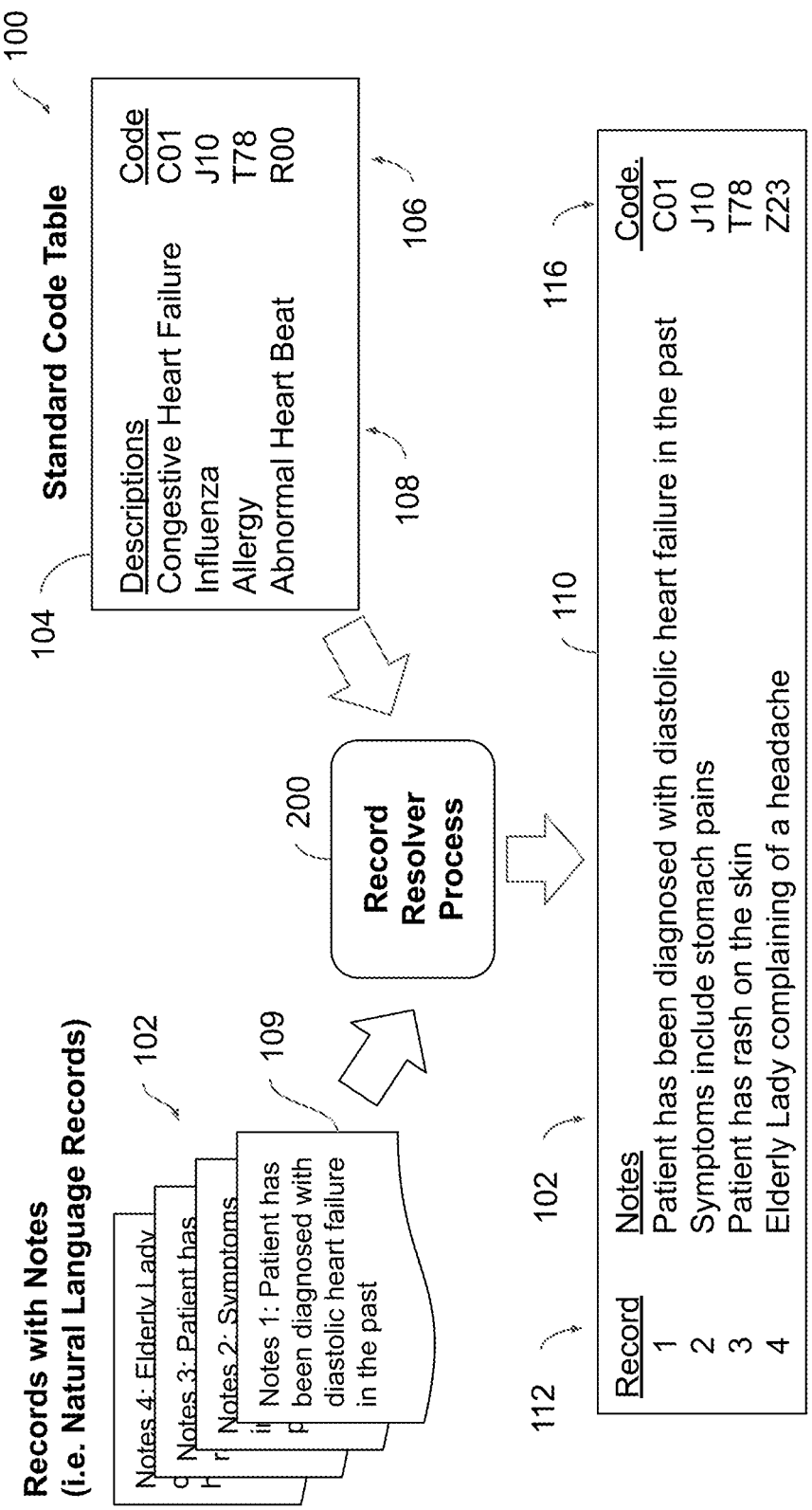
FIG. 1 illustrates an example problem.

FIG. 1 shows an illustration 100 of a record resolver process 200 resolving a set of natural language records 102 to their proper category based on category descriptions 108. A set of descriptions 104 may hold codes 106 and their corresponding category descriptions 108. The set of natural language records 102 needs codes assigned to them. The record resolver process 200 may process a natural language record 109 from the set of natural language records 102 to assign the proper code from the list of codes 106 as shown in assignment table 110. The assignment table 110 may hold a record number 112 the natural language records 102 and an assigned code 116.

The set of descriptions 104 may hold disease names as descriptions and standardized terms and a code 106. An example of such a pair may be ("Congestive heart failure", C01) where the first element is a description associated to the code in the second element.

The disease name and code may be from a normalization databases such as ICD-10 in which case the category descriptions 108 is the normalized disease names that correspond to a standardized code, i.e. a code 106, as shown in Table 1 below.

| Standardized Code | Normalized Disease Name |
|---|---|
| I10 | Essential (primary) hypertension |
| I11 | Hypertensive heart disease |
| I12 | Hypertensive chronic kidney disease |
| I13 | Hypertensive heart and chronic kidney disease |
| I14 | Secondary hypertension |
| I15 | Hypertensive crisis |

The record resolver process 200 may categorize the natural language record 109 against the normalized disease name and assign a corresponding standardized code even when the natural language record 109 and the category descriptions 108 (normalized disease names) have no common terms. For example, the natural language record 109 may be "Patient diagnosed with coronary problems, with high blood pressure during last days." In this natural language record 109 the phrase "high blood pressure" indicates hypertensive crisis, to which standardize code 115 should be assigned.

The category descriptions 108 may be from an ontology, for example ontologies that come from the Unified Medical Language System. The category descriptions 108 may come from various sources for example SNOMED-CT, RxNorm, LOINC, MeSH, ICD-10, CPT or others.

An implementation may apply the record resolver process 200 to legal records. For example the natural language record 109 may be a deposition or summary document, or court records and the category descriptions 108 may be a set of legal statutes which a lawsuit could be filed under.

An implementation may apply the record resolver process to comments or posts on a website, in which case the natural language record 109 may be the comment. The category descriptions 108 (the ontology) could be a set of descriptions that correspond to racist, insulting, offensive, inflammatory, innocuous.

An implementation may apply the record resolver process 200 to other types of data, for example financial data, field notes (for example wildlife notes or service call notes), social services case worker notes etc. Correspondingly the corpus of natural language training material may come from various sources for example for financial application from Security and Exchange Commission filings, annual reports, articles from financial newspapers, articles from financial magazines, articles from financial websites and the like. Field notes corpus of natural language training material may come from corresponding related journals or repair manuals or other related sources. Social services corpus of training material may come from journals, full case histories of completed cases etc.

The term "entity resolution" is also known as "entity normalization." In this document the term "category" may refer to either a classification (meaning mutually exclusive groups) or may refer to categorization (meaning groups that overlap).

Figure 2:
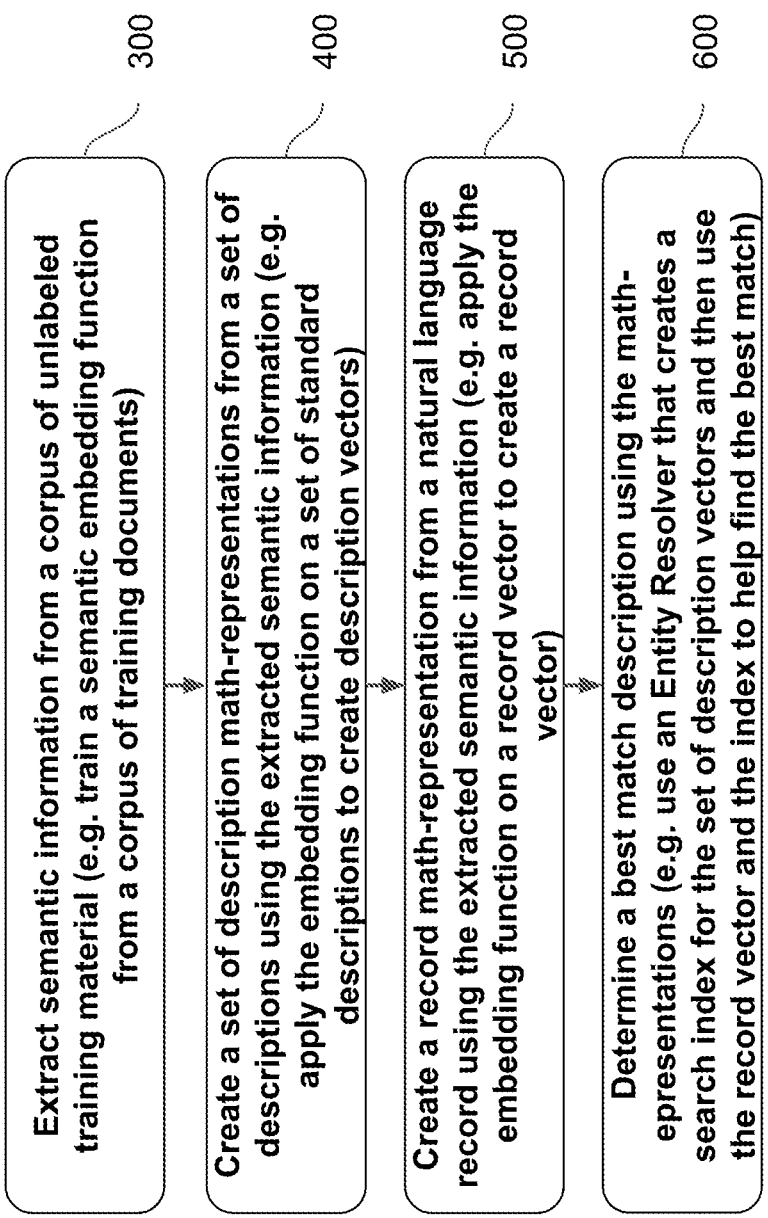
FIG. 2 is an overview of the record resolver process.

FIG. 2 illustrates a process flow 202 showing one possible view of the record resolver process 200. The process flow 202 starts at box 300 where the process flow 202 may extract semantic information from a corpus of unlabeled training materials. For example the unlabeled training material may be natural language articles and the extraction of semantic information may be the creation of a semantic embedding function based on the natural language articles.

Next at box 400 the process flow 202 may continue by creating math-representations of the category descriptions 108 from a set of descriptions 104. For example, the process flow 202 may use an embedding function on a set of standard descriptions to create a set of description vectors.

Next at box 500 the process flow 202 may continue by creating math-representations of a natural language record 109 using the semantic information, for example using an embedding function on the natural language record to create a record vector.

Finally at box 600 the process flow 202 may finish by utilizing the math-representations for both the descriptions and the natural language record to determine a best matched description for the natural language record 109. For example during this part of the process flow 202 an entity resolver may be employed that determines a best match description by creating a search index of the set of description vectors and using the record vector as a query to help find the best match description.

Once the best match has been determined the record resolver process 200 may also assign the associated code 116 related to the best match description.

Figure 3:
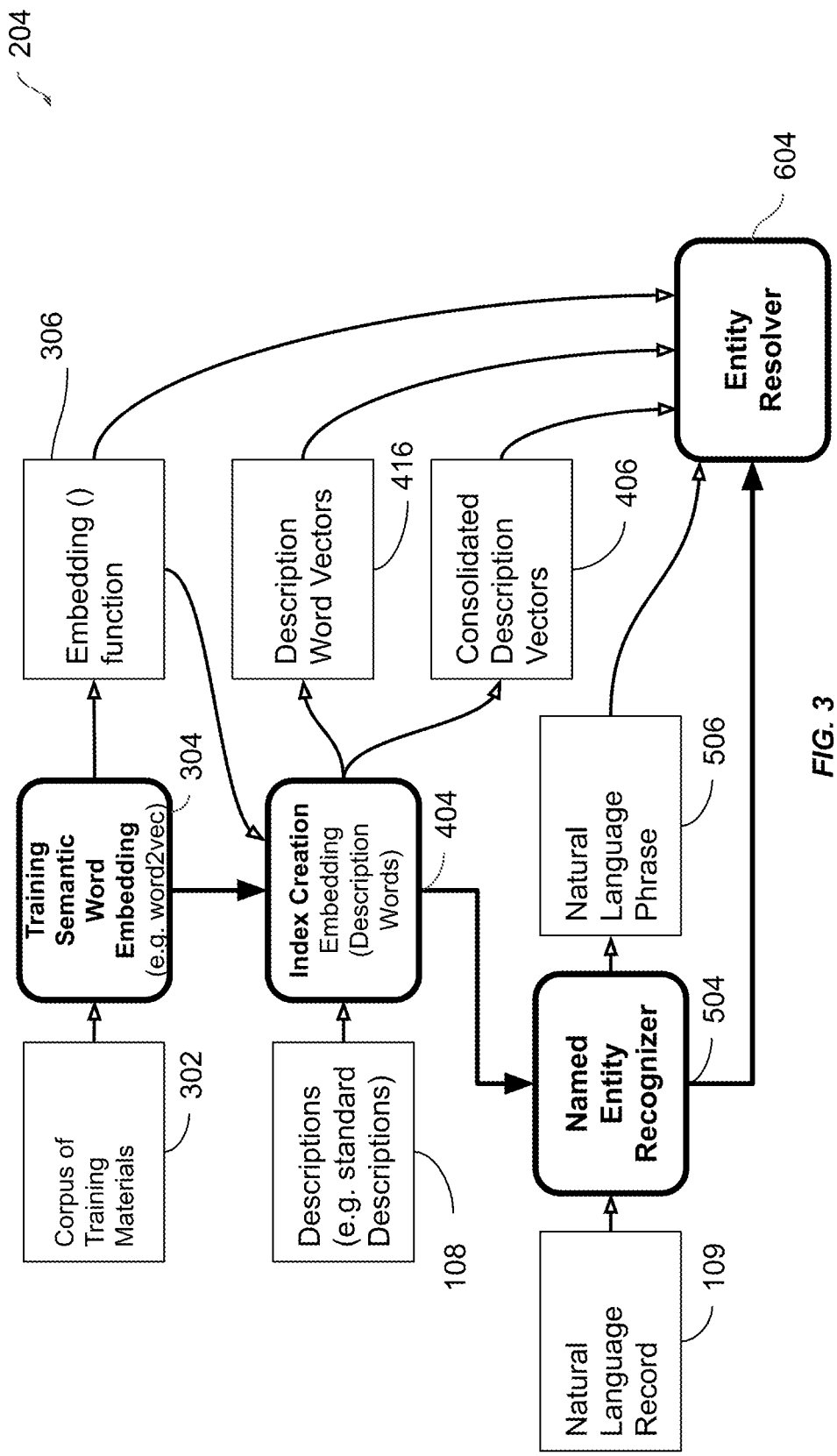
FIG. 3 is a detailed view of one implementation of the record resolver process showing details of the data movement.

FIG. 3 illustrates one possible detailed process flow 204 that may implement the record resolver process 200. The process flow 204 starts at box 304 that may receive a corpus of training materials 302. The process flow 204 may use the corpus of training materials 302 at box 304 to train a semantic embedding function 306.

The process flow 204 may continue at box 404 that may receive a set of category descriptions 108, for example a standardized set of categories which are predefined or the process flow may create an extemporaneous list of categories to solve a particular problem. At box 404 the process flow 204 may use the semantic embedding function 306 to create for each description a set of description word vectors 416 and create a consolidated description vectors 406 for each category descriptions 108.

The semantic embedding function 306 receives a string and returns a vector of real numbers.

Next, at box 504 a natural language record 109 may be received. The process flow 204 may identify a subset of the words from the natural language record 109 that are of a specific kind by using a Named Entity Recognizer. For example the process flow 204 may take the words related to treatment or the words related to a medical problem to create natural language phrases 506.

The process flow 204 may continue with an entity resolver process 604 where the process flow 204 may provide the entity resolver process 604 with the semantic embedding function 306, the natural language phrases 506, the consolidated description vectors 406 and the description word vectors 416 for the entity resolver to determine the best matched description for the natural language record 109.

The process flow 204 may repeatedly start at box 504 for various natural language records 102, and then the entity resolver process 604 may reuse the description word vectors 416 consolidated description vectors 406 and any indexes derived from them to efficiently resolve various natural language records 102.

Figure 4:
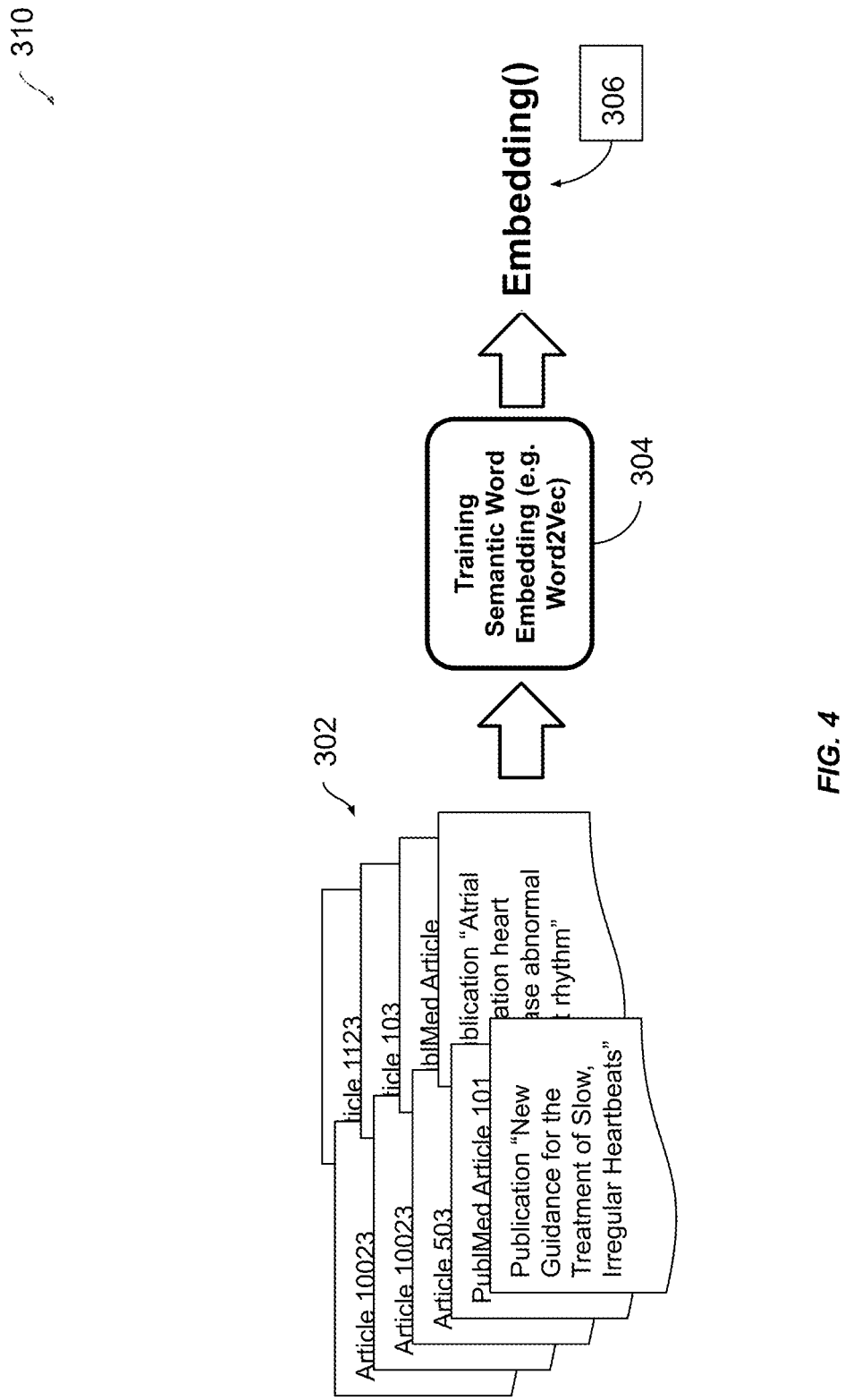
FIG. 4 illustrates extracting semantic data into a semantic embedding function from a corpus of natural language documents.

FIG. 4 provides an illustration 310 that shows an example of extracting semantic data from a corpus of training materials 302. In this example the semantic information is extracted into a semantic embedding function 306. In machine learning semantic analysis is the task of building structures that approximate concepts from a large set of documents. Various semantic analysis tools are available in machine learning. One particular approach is to transform each word into a vector. Transforming the text used into a specific numerical vector may be accomplished by various methods. For example using probabilistic relationships between words in the documents, as is found in tools such as Word2vec by Tomas Mikolov at Google, "GloVe: Global Vectors for Word Representation" by Jeffrey Pennington, et al., etc. Examples of other tools that can create embedding functions include ELMo, ULMFit, BERT and others. The embedding functions these tools create allow the words that exist in the documents to be represented in a mathematical vector were each dimension of the vector has been found to correlate to some statistical relationship to other words in the corpus of documents, e.g. semantic vector space.

The record resolver process 200 is able to identify indirect relationships between the natural language record 109 and the category descriptions 108 according to what can be mined from the corpus of training materials. What can be mined from the corpus of training materials can be represented mathematically, for example a semantic embedding function 306. The semantic embedding function 306 can transfer a word to a math-representation for example a set of numbers specifically a vector representing that word in the semantic space of a corpus of documents. The semantic embedding function 306 creates a "latent variable space" (i.e. normally unseen variable space) that may be implemented on a word by calling the semantic embedding function 306.

Extracting semantic information from a corpus of training material may involve using the distributional hypothesis. The distributional hypothesis in linguistics is derived from the semantic theory of language usage, i.e. words that are used and occur in the same contexts tend to purport similar meanings. The underlying idea is that "a word is characterized by the company it keeps."

This training of the semantic embedding function 306 allows the building of an index in an unsupervised fashion, with minimal human intervention. The results allows for unsupervised training (that is without already categorized examples of natural language notes) and the results may be checked to ensure the categorization is good with a validation step, as described below.

The corpus of training material may come from various sources, for example PubMed to create a semantic embedding function 306 to translate words into a medical semantic space.

The record resolver process 200 models "latent variables" (like hidden causes that explain the data), that is the dimensions of the embedding, it is how the corpus of training material is modeled, and the search space the semantic embedding function defines. The use of embedding makes the search less dependent on common terms being present in both the natural language record 109 and the category descriptions 108. The use of a semantic word embedding function can exploit the relationship that exists between words in spite of the words not looking similar, which is because words with similar meaning are often used in the same context or found together.

The process of aggregating the corpus training material may involve creating a vector for each word in the material, the materials are blocks of natural language records where a block is for example an article. The process of aggregating may have the words in a block being related statistically to the words before or after it, and the statistics of these relationships may be captured in a vector known as a semantic word vector. Accordingly, each word that appears in the corpus of training documents may have a corresponding semantic word vector. The semantic embedding function may take a word and provide the semantic word vector. The vector that the semantic embedding function 306 produces has its own context, and that context is meaningful in connection with the semantic context of the corpus of training material 302.

The corpus of training materials to develop the semantic embedding function 306 should be of sufficient number (hundreds if not thousands).

The semantic embedding function 306 may take a provided word and return a set of numbers representing a semantic vector. The semantic vector may be a series of real numbers. The vector may be 100 to 200 dimensions or more in length that is 100-200 numbers or more in length. Each dimension represents a scalar weight for some mathematically found aspect of the semantic space of the corpus of training documents. The semantic embedding function 306 is one example of extracted semantic information.

Figure 5:
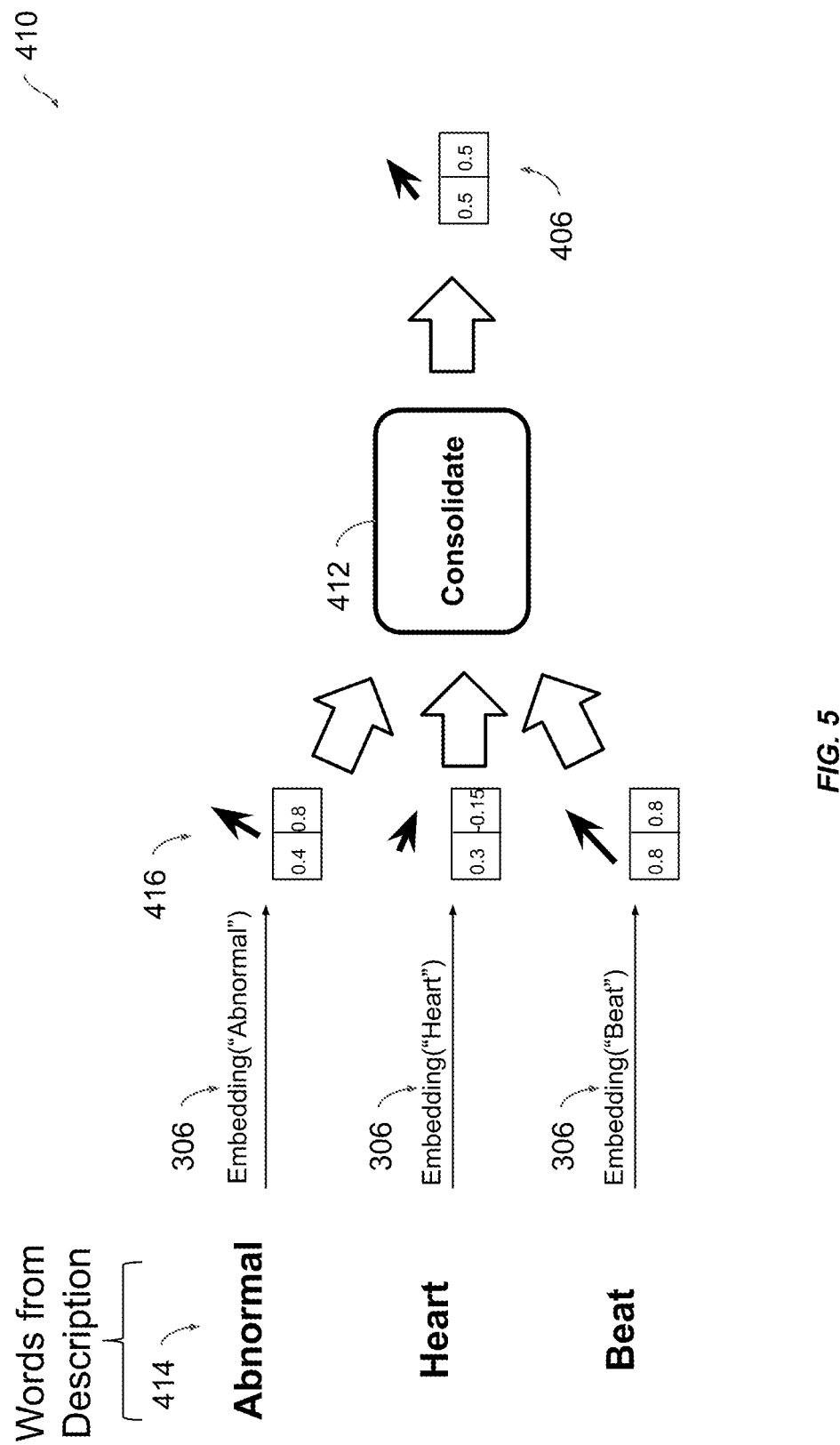
FIG. 5 illustrates using the semantic embedding function to transform a description into semantic vector space and consolidating.

FIG. 5 provides illustration 410 that depicts using the semantic embedding function 306 to transform a description from the category descriptions 108 into semantic vector space. At box 412 the record resolver process 200 may create a consolidated description vectors 406. For illustrative purposes only the illustration 410 shows the vectors as two-dimensional, but as mentioned previously the actual dimensions are substantially larger. The record resolver process 200 may take each word of the description 414 through the semantic embedding function 306 to come up with a description word vector 416 for each word. The record resolver process 200 may consolidate the description word vectors 416, into a consolidated description vector 405. The consolidation may be done by averaging each of the dimensions to arrive at a centroid. For example, expressed mathematically the consolidation maybe written as follows: Centroid("Congestive heart failure")=⅓*(Embedding("Congestive")+Embedding("heart")+Embedding("failure")), where the centroid and the embedding functions produce vectors.

Figure 6:
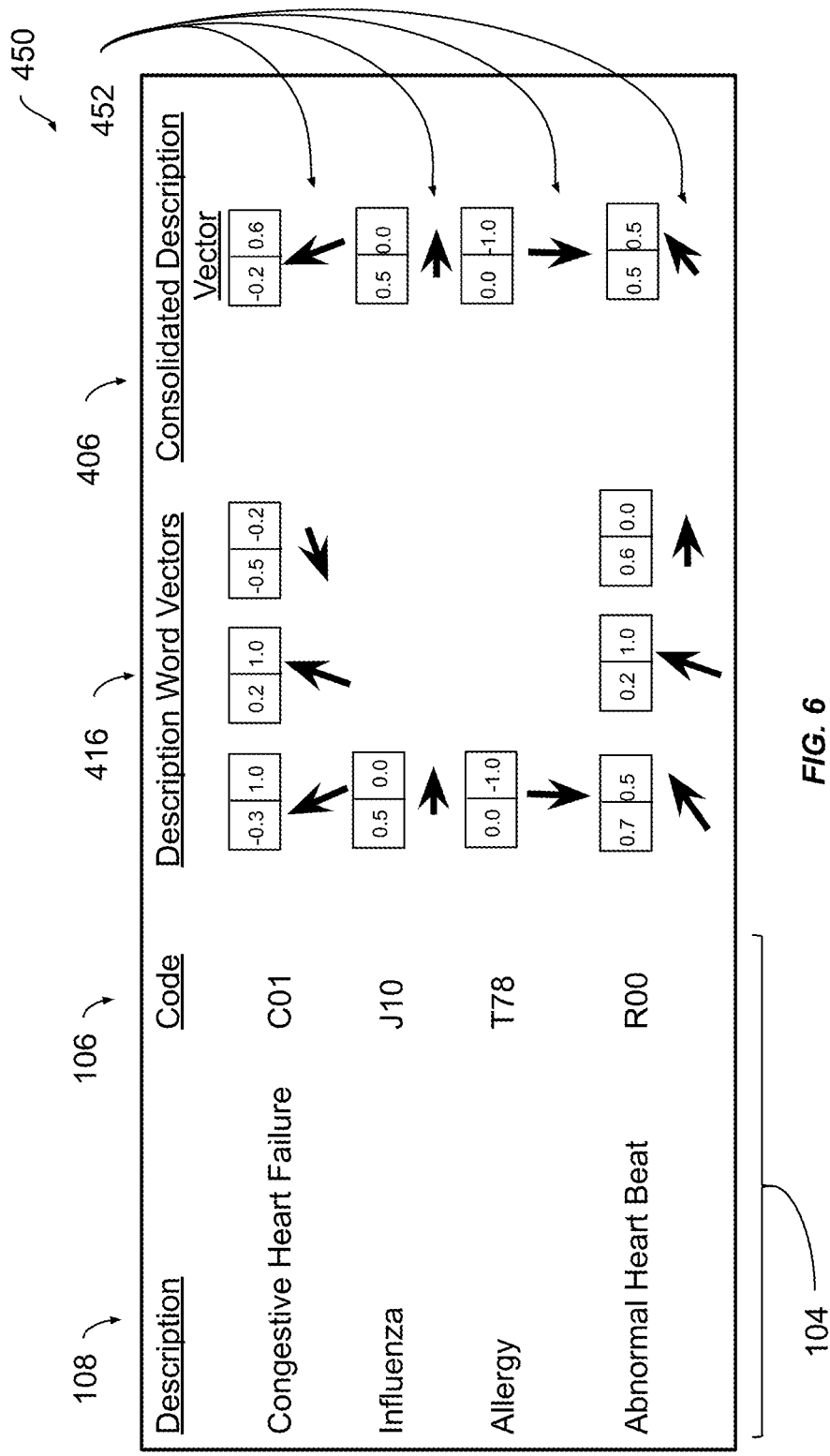
FIG. 6 illustrates an example of a set of descriptions and their corresponding consolidated description vectors.

FIG. 6 provides a table 450 that shows an example set of descriptions 104 with the category descriptions 108, the codes 106 and their corresponding description word vector 416 and consolidated description vectors 406. Also shown is a graphical representation 452 of the description word vectors 416 and consolidated description vectors 406. As discussed previously the illustration depicts the vectors as two-dimensional but in reality they have significantly more dimensions.

The record resolver process 200 may convert the natural language record 109 into a math-representation of the Natural Language record using the extracted semantic information. The record resolver process 200 may create a math-representation for the category descriptions 108. Then the record resolver process 200 may use the math-representation to find the best description using that] math representation of the natural language record and the math-representations of the description. For example the record resolver process 200 may extract the semantic information into a semantic embedding function 306 and the record resolver process 200 may convert every word of the natural language record 109 into semantic vector space. Then the record resolver process 200 may find the best match between the natural language record 109 and the category description using various techniques, for example the record resolver process 200 may use a word mover distance calculation between the set of vector representation of the natural language record 109 and the vector representation of the category descriptions 108.

The word mover distance calculation comes from the earth mover distance calculation which is a technique that allows the calculation of how to move dirt (i.e. earth) from one configuration to another configuration. For example if a company has various warehouses full of dirt and a number of customers in need of various amounts of dirt then the earth mover distance calculation can tell you the transportation cost for moving the earth from the current location in the warehouses to the destination location at the customers sites. A different company with a different set of warehouses could also calculate the transportation cost using the earth mover distance calculation. Whichever company had the lowest earth mover distance to service the set of customer orders would indicate that the dirt stored in the company's warehouses are closer to the customer delivery sites. Each day depending on customer orders there would be a different cost of moving the dirt for each company. The analogy is that a company's set of dirt in the warehouses are the words in the category description 108 and the customer order sites are the words in a natural language records 109. The word mover distance can tell the cost for moving from the natural language record 109 to a given category description 108. The category description with the lowest cost would be the one that is closest in meaning and thus should provide the best category match for the natural language record 109.

The problem with the word mover distance calculation is that it is computationally intensive so the record resolver process 200 may choose to implement further steps to narrow the potential category matches to a list of potential candidates. Then to be more computationally efficient the record resolver process would only apply the word mover distance calculation to the list of candidate descriptions.

Figure 7:
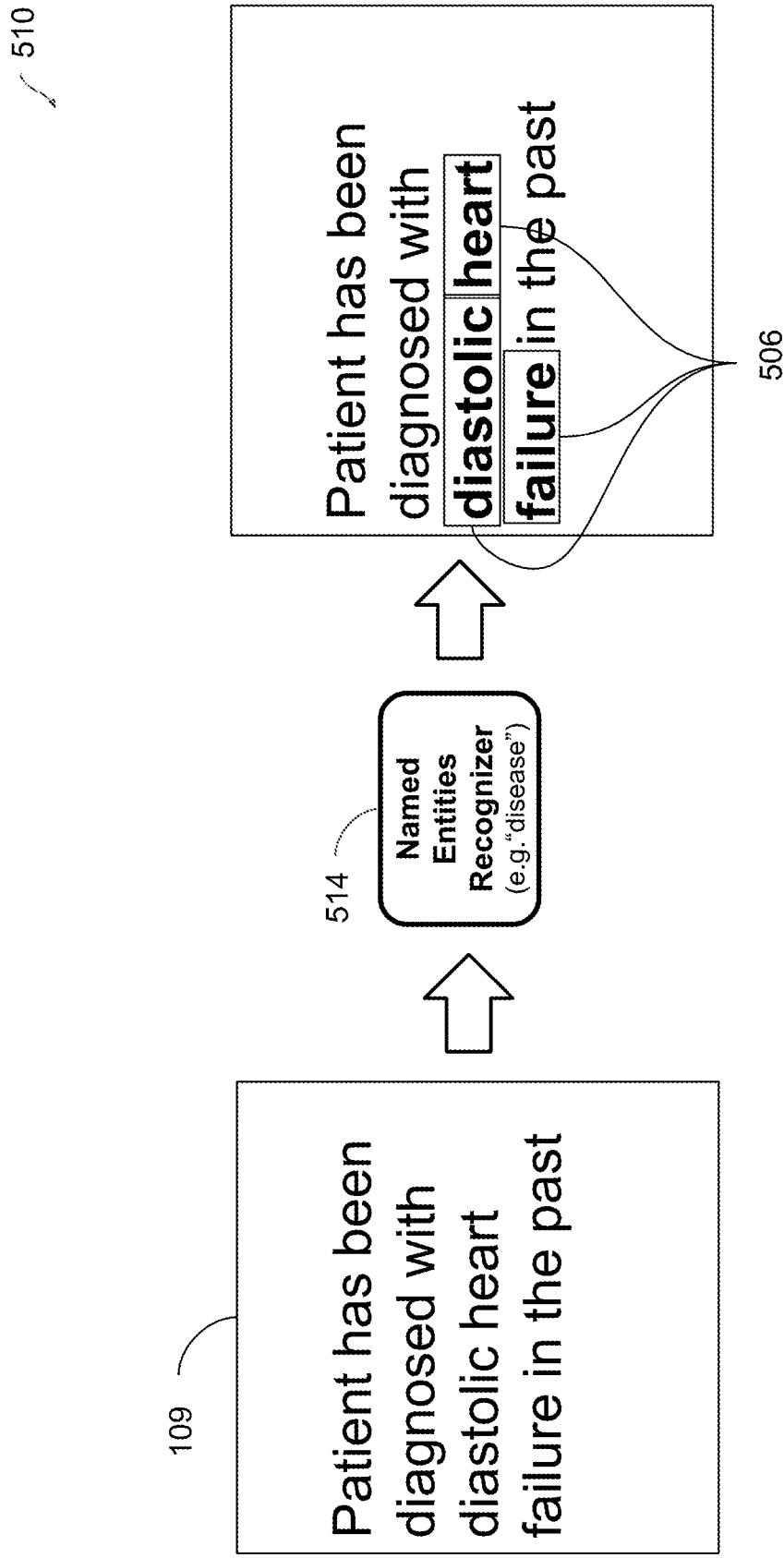
FIG. 7 illustrates an example of applying a named entity recognizer to a natural language record to identify relevant natural language phrases.

FIG. 7 provides an illustration 510 that the record resolver process 200 may reduce the set of words from the natural language record 109 to natural language phrase 506 or natural language phrases. The illustration 510 applies a named entity recognizer 514 to the natural language record 109. The named entity recognizer 514 may identify words, for examples such as those related to disease e.g. "dystonic heart failure." The words that the named entity recognizer 514 identifies may make up a natural language phrase 506.

Named entity recognizers 514, detect entities in natural language text and assign words related to that entity a label, for example, in the sentence, "Patient undergoes physical therapy as a treatment for lumbar pain." The named entity recognizer 514 may label "physical therapy" is a 'treatment' and "lumbar pain" is a 'problem.' Where 'treatment' and 'problem' are types of Named Entities. The set of Named Entities or labels that the record resolver process 200 uses may be selected to be relevant for the category descriptions 108.

The record resolver process 200 may use other alternatives besides named entity recognizers 514 such as Chunkers or other techniques to help arrive at the natural language phrases 506.

Figure 8:
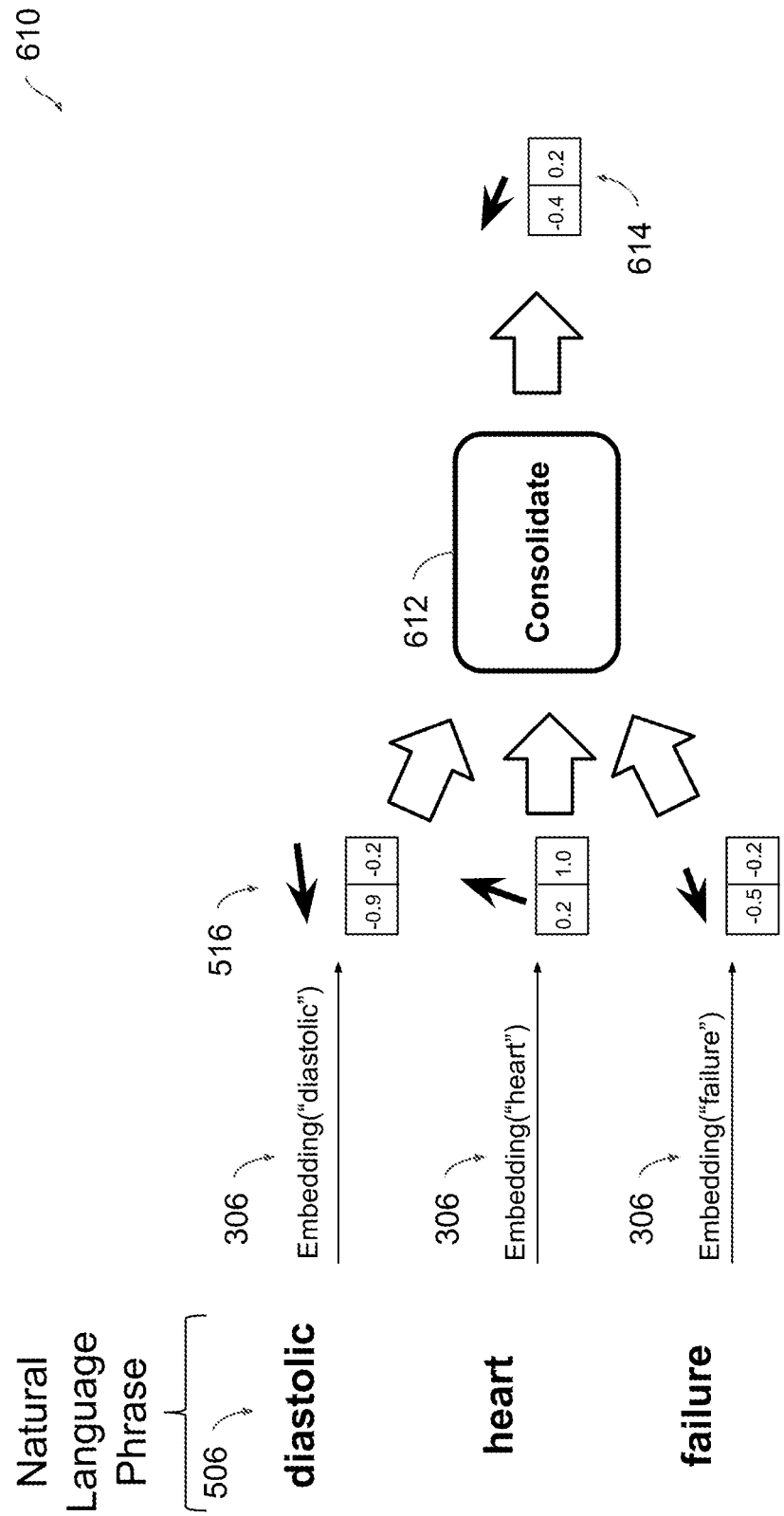
FIG. 8 illustrates an example of transforming a natural language phrase of the natural language record into semantic vector space and consolidating.

FIG. 8 provides an illustration 610 that depicts using the semantic embedding function 306 to transform the natural language phrase 506 into semantic vector space and consolidating at box 612 to a consolidated record vector 614. For illustrative purposes only, to help provide intuition of how the record resolver process 200 works, the vectors are shown being two-dimensional, but as mentioned previously the actual number of dimensions would be substantially larger. The record resolver process 200 may run each word from the natural language phrase 506 through the semantic embedding function 306 to come up with the semantic record word vector 516. Alternatively the record resolver process 200 may instead use a named entity recognizer on the natural language record 109 and only process the natural language phrase 506 through the semantic embedding function 306 to come up with the semantic record word vectors 516. The record resolver process 200 may consolidate the semantic record word vectors 516, for example by averaging each of the dimensions to arrive at a consolidated record vector 614.

At this point the record resolver process 200 has the natural language record 109 represented with the consolidated record vector 614 and the best match from the set of category descriptions 108 needs to be found. One way to find the best match may be using the consolidated record vectors 614 and the consolidated description vectors 406. Various techniques exist for finding the best match between vectors. One possible technique to find the best match is described next.

Figure 9:
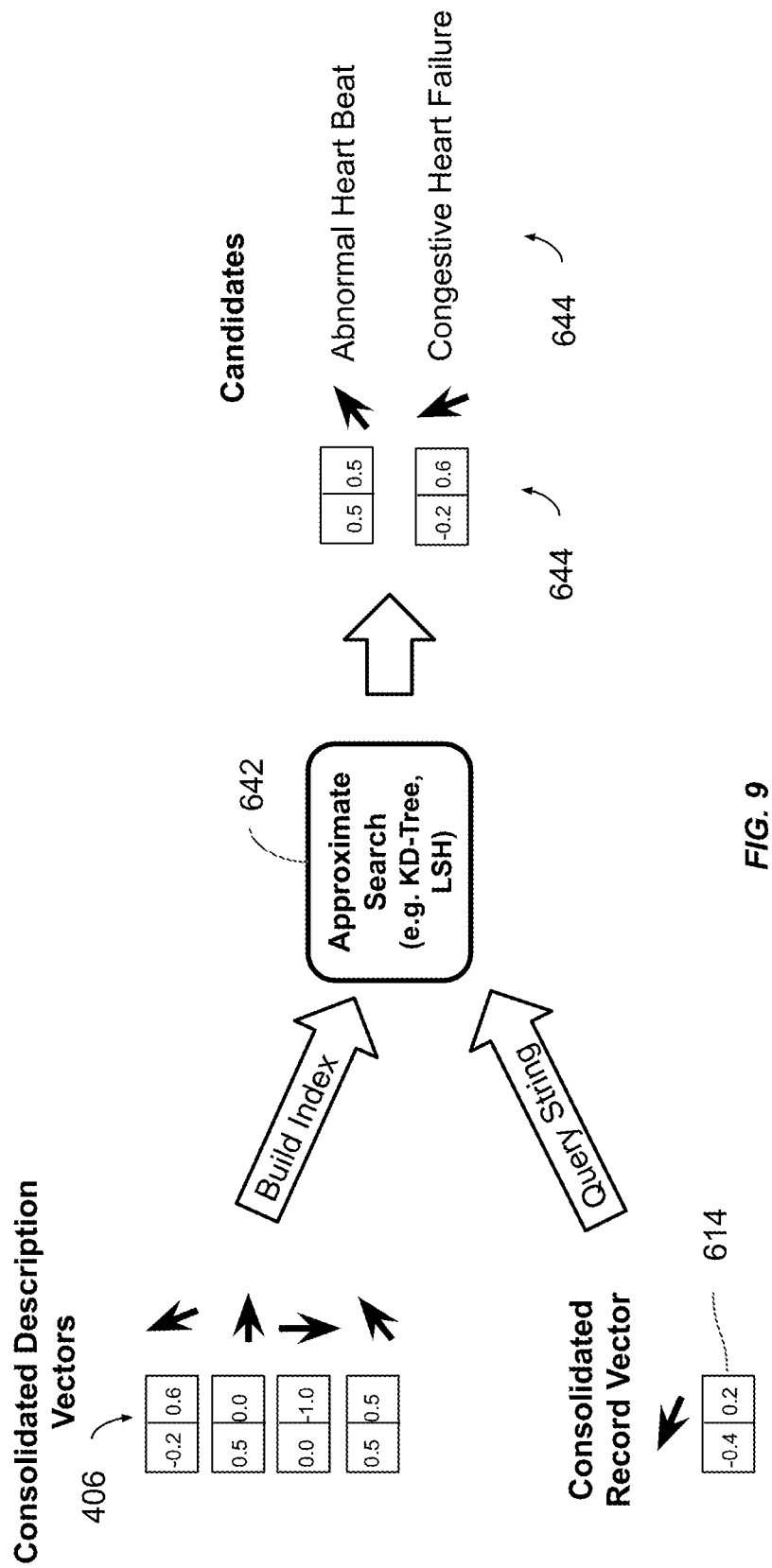
FIG. 9 illustrates the first step, a screening step that creates a set of candidate descriptions, from a list of possible descriptions.

FIG. 9 provides an illustration 640 of a first step of a two-step search process to determine for the consolidated record vector 614 a best match consolidated description vector from the set of consolidated description vectors 406. The first step may be a screening step. For example the record resolver process 200 may use an approximate search technique 642 for example k-d tree or locality-sensitivity hashing (LSH) or other nearest neighbor search techniques to generate a list of candidate vectors 644. The approximate search technique 642 may do a one-time processing of the consolidated description vectors 406 into a search index like a k-d tree. Then the screening step may take the consolidated record vector 614 associated to the natural language record 109, sometimes known as a query string, and use the k-d tree to help find the nearest neighbors, that is find the set of closest consolidated description vectors 406 to produce the list of candidate vectors 644. For example the record resolver process 200 may compute a metric, for each candidate vector 644. The metric may be the distance between the consolidated record vector 614 and the consolidated description vectors 406. The record resolver process 200 may use the Euclidean distance as the metric. The record resolver process 200 may rank the consolidated description vectors 406 by the metric and then set a lower bounds so only consolidated description vectors 406 above the lower bounds make the list of candidate vectors 644.

Figure 10:
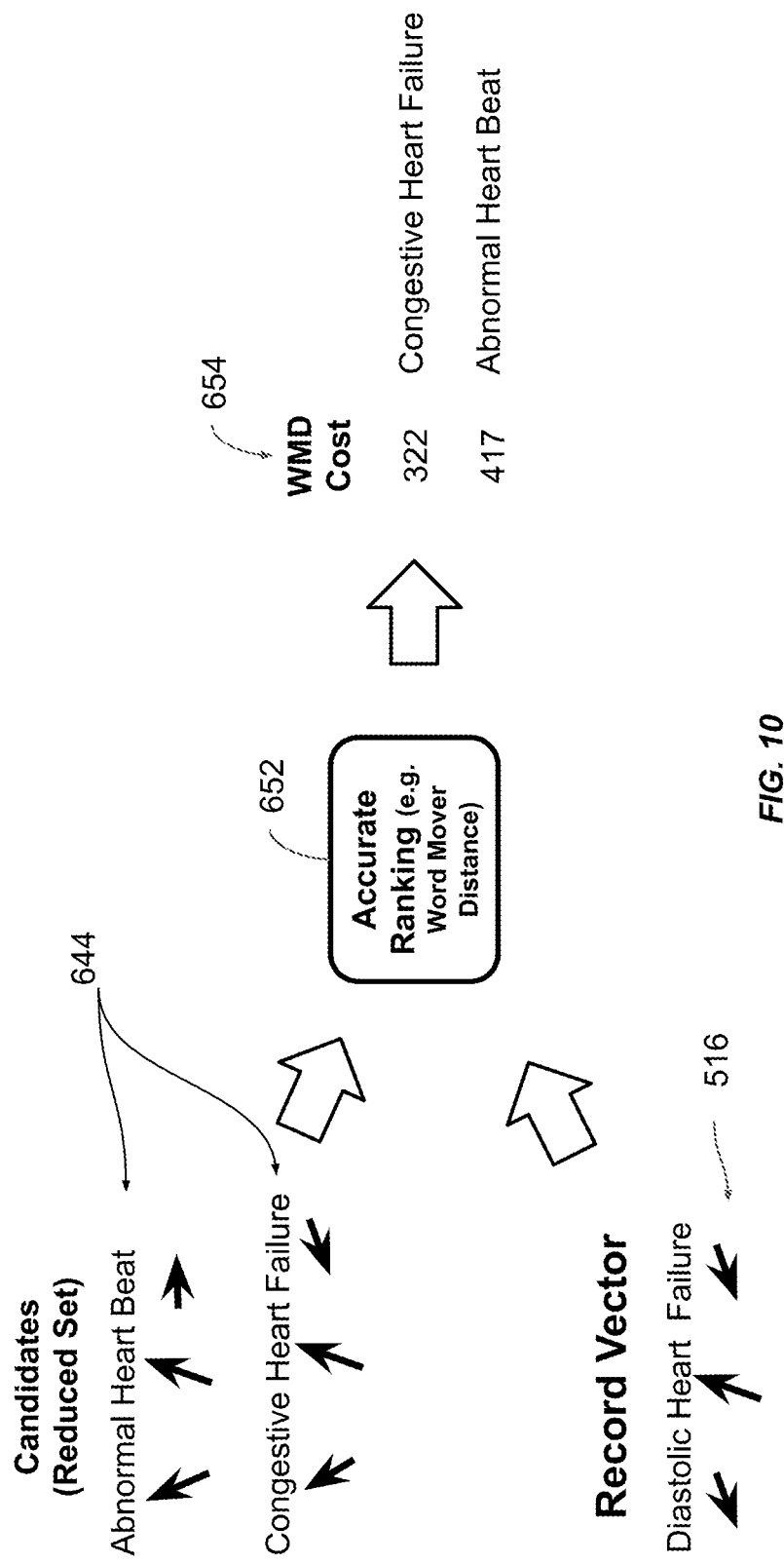
FIG. 10 illustrates the second step, a ranking step that ranks the set of candidate descriptions, to determine the best match description.

FIG. 10 provides an illustration 650 of a second ranking step of the two-step search process. The record resolver process 200 may use a more accurate method 652 on the candidate vectors 644 to help determine the best match. The record resolver process 200 may compare the semantic record word vectors 516 and the description word vectors 416. For example the record resolver process 200 may use the word mover distance cost 654 for each candidate description and order the candidates by the word mover distance cost where the lowest cost is the best match.

By using the semantic embedding function 306 the record resolver process 200 may use knowledge transfer from the information in the corpus of training material and bring it to bear on the entity resolver problem.

By creating a search based on semantic word embedding, the record resolver process 200 may relate concepts even when there are no common terms existing between the natural language record 109 (e.g. an input search string) and the list of category descriptions 108 (e.g. indexed standardized terms).

The record resolver process 200 may enable the automated processing of natural language records. The record resolver process 200 may include the entity resolver process 604 may be one processing stage in a natural language processing pipeline consisting of multiple stages, such that after a standard code 106 has been assigned that record may be further processed. In the same way the entity resolver uses input of other stages like the named entity recognizer 514, other stages like patient billing, or patient risk profiling may use the entity resolver output as input to higher level decisions. For example, in the medical field once the record resolver process 200 assigns a standard medical code that code may be used to do patient billing and then be provided as input to other stages with higher levels of abstraction like patient risk profiling.

Although there is no supervised training for the record resolver process 200 a validation procedure may validate that the record resolver process 200 is properly categorizing the natural language records 102. For example, something like the following validation procedure may be used.

First the user of the record resolver process 200 should identify the category descriptions 108. Next the user, knowing the category descriptions 108 should acquire a corresponding related corpus of training materials 302. The corpus of training materials 302 should use the words of the category descriptions 108 in the same context. So for example for medical diagnostic descriptions a proper corpus of training material would be articles about medical diagnosis for example from PubMed. The corpus of training material 302 should be large, for example the size may be on the order of 900 to 9,000 or more articles that should provide 10,000 to 100,000 uses of the words found in the category descriptions 108. Another way to get a rough estimate for the size of the training materials needed is for it to provide two to three orders of magnitude larger than the terms in the category descriptions 108, so for example if there are 100 unique terms in the category descriptions 108 then the corpus of training materials should be provide 10,000 to 100,000 examples of the words being used. The training material may be documents, articles, newspapers, books, corpus linguistics, or anything that can provide examples of using the words in a natural language context. For financial entity resolver problems the corpus of training material 302 may include financial magazine articles, Security and Exchange filings or other financial related natural language material. For legal entity resolver problems the training materials 302 may include court records, legal books, legal treaties or other natural language materials about the law.

Next the validation process should train the semantic embedding function 306 from the corpus of training materials 302. The user should identify the named entity recognizer 514 by either finding an existing pre-trained named entity recognizer 514 or training a new named entity recognizer 514. The user should identify the labels related to the category descriptions 402 that are likely to be important filters to apply to the natural language records 102.

The user would continue the validation procedure by acquiring a validation data set of already categorized natural language records. The user should run some natural language records of the validation data through the record resolver process 200 to see if proper categorization is done. If the categorization is not accurate enough then adjustments should be made to the record resolver process 200, as is normal in the industry, for example by adjusting the creation or running of the semantic embedding function 306, the named entity recognizer 514 or the corpus of training materials 302. The user can try adjusting the parameters and hyper parameters used for training the semantic embedding function 306. Also the user can try adjusting the parameters or hyper-parameters of generation of the named entity recognizer 514 or the label list. If the user adjusts the parameters and hyper parameters but is not able to make the record resolver process 200 produce accurate enough results then a different corpus of training material may be acquired. The different corpus of training material may be the original training material plus additional new documents or an entirely new corpus of training documents altogether.

Figure 11:
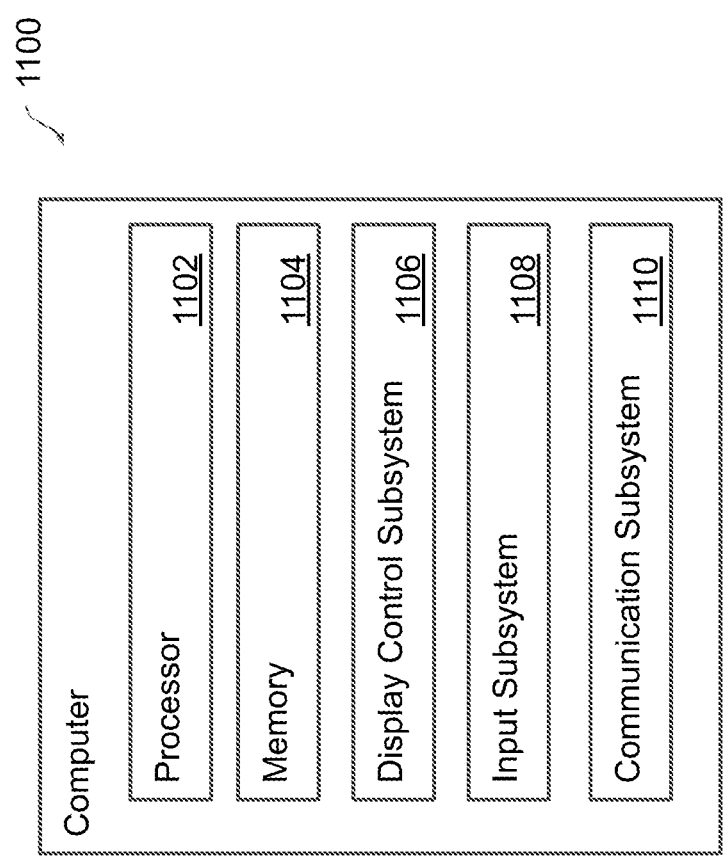
FIG. 11 is a block diagram of a computer.

FIG. 11 is a block diagram of a computer 1100. The computer 1100 may have a processor 1102, a memory 1104, a display control subsystem 1106, an input subsystem 1108 and a communication subsystem 1110.

The processor 1102 may execute machine-readable instructions. The processor 1102 may execute the instructions on one or more virtual or physical electronic processing devices. For example, the processor 1102 may execute instructions to perform steps and processes described in this document. The processor 1102 may include one or more processors to execute the machine-readable instructions.

The memory 1104 may include computer-readable medium that contains instructions that the processor 1102 can execute. The computer-readable medium (also referred to as a processor-readable medium) may include any non-transitory ephemeral (like not radio waves), or tangible medium that participates in providing data (e.g., instructions) that may be read by the processor 1102 of the computer 1100. Such a medium may take many forms, including, but not limited to, non-volatile media and volatile media. Non-volatile media may include, for example, optical or magnetic disks, solid-state memory, a floppy disk, a flexible disk, a hard disk, a magnetic tape, any other magnetic medium, a CD, a CD-ROM, a DVD, any other optical medium, punch cards, paper tape, any other physical medium with patterns of holes, ROM (Read Only Memory), a PROM (Programmable Read Only Memory), an EPROM (Erasable Programmable Read Only Memory), a FLASH-EPROM, a USB drive (e.g. Thumb Drive), SD cards, any other memory chip or cartridge, other persistent memory, or any other medium from which a computer can read. Volatile media may include, for example, RAM (Random Access Memory) like static random access memory (SRAM) or dynamic random access memory (DRAM), which typically constitutes a main memory.

The memory 1104 may hold the items described in this document for example the word2vec, the Word Mover Distance calculation, the semantic embedding function 306, and other information and computer executable instructions necessary to carry out the processes described in this document.

The display control subsystem 1106 may facilitate displaying the media by sending signals to a display screen. The computer 1100 may provide an integrated display control subsystem 1106, memory 1104, and processor 1102 such that computer 1100 executes machine readable media to provide the methods described in this document.

The input subsystem 1108 may receive user input. The input subsystem 1108 may connect to and receive input from devices such as a mouse, a keyboard, a touch screen, a touch screen with a keyboard on it a, touch screen with a number keypad on it, a microphone, a camera. For example, a user may indicate that the computer 1100 is to execute a certain task, such as requesting the computer 1100 display any of the information described in this document.

The communication subsystem 1110 may allow execution of the methods described in this document over a network. For example, the communication subsystem 1110 may enable the computer 1100 to communicate with a plurality of other computing devices running the programs described in this document on other servers. The program may run on the other servers in parallel.

The communications subsystem 1110 may receive computer instructions for the processor 1102, and those instructions may be stored in the memory 1104.

The communication subsystem 1110 may communicate with a network by one or more transmission media, including wired (coaxial cables, copper wire and fiber optics, including the wires that comprise a system bus coupled to a processor 1102 of the computer 1100) or wireless.

The communication subsystem 1110 may be equipped to communicate over many technologies that may be part of the network. For example, the communication subsystem 1110 may be equipped with a Wi-Fi module that connects to mobile hotspots (via WiFi) which may connect to the internet. Wireless communication may include a cellular wireless network, Wi-Fi communications network, a wired Ethernet network, or any communication means that facilitate networked communication with other computing devices. In addition, the communication subsystem 1110 may be capable of communicating via any number of short-range wireless technologies for example Bluetooth, Near Field Communication (NFC), ZigBee, infrared, Wide Area Network (WAN), etc.

In general, the processor 1102 may receive instructions, for example from the memory 1104 and executes those instructions, thereby performing the functions described in this document. Such instructions and other data may be stored and transmitted using a variety of computer-readable media.

With regard to the processes, systems, methods, heuristics, etc. described in this document, it should be understood that, although the document describes the steps of such processes, etc. as occurring in a certain sequence, in practice the processes might follow a different sequence. Further, although the record resolver process 200 may have described certain steps performed simultaneously, other steps may be added, or certain steps described may be omitted. In other words, the descriptions of processes provided are for illustrating certain embodiments, and in no way limit the claims.

Accordingly, it is to be understood that the above description is intended to be illustrative and not restrictive. Many embodiments and applications other than the examples provided would be apparent upon reading the above description. The scope should not be determined with reference to the above description, but should instead be determined with reference to the appended claims, along with the full scope of equivalents to which such claims are entitled. It is anticipated and intended that future developments will occur in the technologies discussed in this document, and that the disclosed systems and methods will incorporate such future developments. In sum, it should be understood that the application is capable of modification and variation.

All terms used in the claims are intended to be given their broadest reasonable constructions and their ordinary meanings as understood by those knowledgeable in the technologies described unless there is an explicit indication to the contrary in this document. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, the following claims reflect inventive subject matter with less than all features of a single disclosed embodiment. The following claims are hereby incorporated into the Detailed Description, with each claim standing on its own as separately claimed subject matter.

What is claimed is:

1. A computer process for entity resolution of natural language records comprising:
    training an unsupervised semantic embedding function on a corpus of unlabeled training materials using an unsupervised process, where the unsupervised semantic embedding function takes a word and represents it as a semantic vector, where the semantic vector represents the word as it relates to the semantic information of the corpus of unlabeled training materials;
    generating a list of descriptions using the unsupervised semantic embedding function into a list of description semantic vectors representing the list of descriptions;
    using words from a natural language record and the unsupervised semantic embedding function to generate a record semantic vector representing the natural language record; and
    finding a best match description from the list of descriptions by finding a best match description semantic vector from
    the list of description semantic vectors generated by the unsupervised semantic embedding function trained on the corpus of unlabeled training materials using the unsupervised process that is closest to
    the record semantic vector generated by the unsupervised semantic embedding function trained on the corpus of unlabeled training materials using the unsupervised process,
    where finding the best match description uses a screening step that screens the list of descriptions using the description semantic vector from the unsupervised semantic embedding function to get a list of candidate descriptions and a ranking step that further processes the list of candidate descriptions to find the best match description.

2. The computer process for entity resolution of natural language records of claim 1 where the screening step uses a k-d tree search.

3. The computer process for entity resolution of natural language records of claim 1 where finding the best match uses word mover distance.

4. The computer process for entity resolution of natural language records of claim 1 further comprising using a named entity recognizer on the natural language record.

5. The computer process for entity resolution of natural language records of claim 1 further comprising using chunking or collocation detection on the natural language record.

6. The computer process for entity resolution of natural language records of claim 1 where the training of the semantic embedding function uses a distributional hypothesis.

7. A natural language record entity resolution process comprising:
    using machine learning on a computer to extract semantic information from a corpus of unlabeled training material;
    generating a list of normalized descriptions using the semantic information into a corresponding set of description semantic math-representations;
    generating a natural language record using the semantic information to a record semantic math-representation; and
    determining a best match normalized description for the natural language record using a search process by finding
    a best match description semantic math-representation from
    the set of description semantic math-representations that was generated using the extract semantic information from the corpus of unlabeled training material that is closest to
    the record semantic math-representation that was transformed using the extract semantic information from the corpus of unlabeled training material,
    where determining the best match normalized description semantic math representation uses a screening step that gets a list of candidate description vectors and a ranking step to further process the list of candidate description vectors to find the best normalized description.

8. The natural language record entity resolution process of claim 7 where the ranking step uses word mover distance.

9. The natural language record entity resolution process of claim 7 where using machine learning to extract semantic information uses a distributional hypothesis.

10. The computer process for entity resolution of natural language records of claim 1 where the corpus of unlabeled training materials is selected from a group consisting of journal articles or books.

11. The computer process for entity resolution of natural language records of claim 1 where the corpus of unlabeled training materials fails to include the list of descriptions or natural language records.

12. The computer process for entity resolution of natural language records of claim 1 further involves consolidating the record semantic vector of the natural language record to arrive at a consolidated record vector.

13. The computer process for entity resolution of natural language records of claim 12 where the consolidating the record semantic vector is done by averaging each of the dimensions to arrive at a centroid.

14. The computer process for entity resolution of natural language records of claim 1 where the list of descriptions includes medical diagnostic descriptions categories.

\* \* \* \* \*